US009389614B2

(12) United States Patent
Shani

(10) Patent No.: US 9,389,614 B2
(45) Date of Patent: Jul. 12, 2016

(54) SYSTEM AND METHOD FOR TRACKING GUIDING LINES BY AN AUTONOMOUS VEHICLE

(71) Applicant: Unitronics Parking Solutions Ltd, Ben Gurion Airport (IL)

(72) Inventor: Haim Shani, Shoham (IL)

(73) Assignee: UNITRONICS AUTOMATED SOLUTIONS LTD, Ben Gurion Airport, Tel-Aviv ( * ) Notice: Subject to any disclaimer, the term of this patent is extended or adjusted under 35 U.S.C. 154(b) by 83 days.

(21) Appl. No.: 14/247,294

(22) Filed: Apr. 8, 2014

(65) Prior Publication Data
US 2015/0286218 A1 Oct. 8, 2015

(51) Int. Cl.
*G05D 1/02* (2006.01)
*B65G 1/137* (2006.01)
*B62B 5/00* (2006.01)
*B60B 30/02* (2006.01)
*B60B 30/10* (2006.01)
*E04H 6/36* (2006.01)
*E04H 6/24* (2006.01)
*G05D 1/00* (2006.01)

(52) U.S. Cl.
CPC .............. *G05D 1/0246* (2013.01); *B60B 30/02* (2013.01); *B60B 30/10* (2013.01); *B62B 5/0083* (2013.01); *B65G 1/137* (2013.01); *E04H 6/24* (2013.01); *E04H 6/36* (2013.01); *G05D 1/0022* (2013.01)

(58) Field of Classification Search
None
See application file for complete search history.

(56) References Cited

U.S. PATENT DOCUMENTS

| 4,947,094 A | * | 8/1990 | Dyer | G05D 1/024 180/168 |
| 5,801,506 A | * | 9/1998 | Netzler | B66F 9/063 180/167 |
| 5,967,727 A | | 10/1999 | Ritsch et al. | |
| 6,104,314 A | | 8/2000 | Jiang | |
| 6,256,560 B1 | * | 7/2001 | Kim | G05D 1/0246 180/168 |

(Continued)

FOREIGN PATENT DOCUMENTS

| CA | 2818840 | 6/2012 |
| CN | 103 529 838 | 1/2014 |

(Continued)

OTHER PUBLICATIONS

Search Report of EP Application No. EP 15 16 0657 mailed on Nov. 26, 2015.

*Primary Examiner* — Yonel Beaulieu
*Assistant Examiner* — Krishnan Ramesh
(74) *Attorney, Agent, or Firm* — Pearl Cohen Zedek Latzer Baratz LLP

(57) ABSTRACT

An autonomous transporting tool is adapted to travel along a guiding line. The tool comprises two transporting elements. Each of the transporting elements comprise autonomous propulsion means, a control system and an optical system. The optical system comprises two cameras and two lighting units. The system is adapted to identify the location of the image of a guiding line within a received image of the floor and to provide steering commands adapted to steer the transporting tool so that the image of the guiding line is located substantially in the center of the received image.

15 Claims, 13 Drawing Sheets

(56) References Cited

U.S. PATENT DOCUMENTS

| | | | |
|---|---|---|---|
| 6,882,910 B2 * | 4/2005 | Jeong | G05D 1/0217 180/167 |
| 8,016,303 B1 | 9/2011 | Ullman | |
| 8,983,649 B2 * | 3/2015 | Checketts | G05D 1/0265 700/213 |
| 2004/0122570 A1 * | 6/2004 | Sonoyama | G05D 1/0297 701/23 |
| 2010/0021272 A1 * | 1/2010 | Ward | B65G 63/004 414/137.1 |
| 2010/0086385 A1 * | 4/2010 | Shani | E04H 6/245 414/232 |
| 2010/0183409 A1 * | 7/2010 | Checketts | B60K 17/30 414/231 |
| 2013/0251481 A1 * | 9/2013 | Shani | E04H 6/34 414/231 |
| 2013/0280018 A1 | 10/2013 | Meirer et al. | |
| 2014/0100717 A1 * | 4/2014 | Yoneda | G05D 1/0297 701/2 |
| 2014/0172223 A1 * | 6/2014 | Murphy | G05D 1/0289 701/25 |
| 2014/0358338 A1 * | 12/2014 | Harasaki | H01L 21/67715 701/19 |

FOREIGN PATENT DOCUMENTS

| | | |
|---|---|---|
| DE | 3909702 | 9/1990 |
| DE | 4216457 | 11/1993 |
| DE | 195 03 878 | 8/1996 |
| DE | 10020236 | 11/2001 |
| JP | 2009 102824 | 5/2009 |
| WO | WO 2002031296 | 4/2002 |
| WO | WO 2012072236 | 6/2012 |
| WO | WO 2004045932 | 6/2014 |

* cited by examiner

SYSTEM AND METHOD FOR TRACKING GUIDING LINES BY AN AUTONOMOUS VEHICLE

BACKGROUND OF THE INVENTION

Automated parking systems are known in the art for many years. One of their goals is to increase the number of parked vehicles in a given parking space, either having a single story or multi-story facility. Converting of an existing traditional parking space into an automated parking space requires, among others, installation and operation of location and navigation means that will enable automated mobile means to load an incoming vehicle at a loading position and transport it to an intended parking area at the beginning of the parking period and to pick a parking vehicle from a given parking space and move it to an exit location at the end of the parking period, as well as enable the automated system to transport a parked vehicle from its current parking area to another, pre-defined parking area.

According to solutions known in the art, elements of the automated parking system that travel through the parking space are directed along route guiding means of electrical wires or conduits that are installed underneath the floor's surface. These wires emit radio-frequency (RF) transmissions at a low energy level. A corresponding receiver is installed on the traveling unit. This receiver is configured to sense the RF transmission and to indicate when the sensor has deviated from traveling substantially above the transmitting wire to the left or to the right. However, this method requires installations that involve either placement of the RF wires during the installation of the respective parking floor or entering the wire into an existing floor. Therefore, when this method is to be used in traditional drive-through parking facilities that are about to be converted to automated parking facilities, only the latter method of installation of the wire is applicable. However, drilling of grooves in an existing floor in order to bury RF transmitting wires along the travel paths may be not only very expensive and time-consuming, but may also require careful work in order not to damage other under-surface installations and in order to avoid risk of damaging constructive elements while performing the grooves. Therefore, there is a need for a method that will enable navigation of a transporting tool along predefined paths that does not involve under-surface installations in the floors.

Known automated parking facilities typically use one of two main approaches for parking vehicles. In the first approach, parked vehicles are placed in long rows where one vehicle is placed with its front bumper very close and even touching the rear bumper of the vehicle in front of it. This parking method may be denominated "tandem mode". When one row is filled, the next row will be occupied on the left or the right of the previous one. In the second approach, parked vehicles are placed "side by side" next to a vehicle on the left or the right of the parked vehicle along column lines. This parking method may be denominated "side-by-side mode". In both approaches, the amount of vehicles parked per area unit depends on the sizes of the vehicles and on the accuracy of movement and placement/pick-up of the automated parking system.

The first parking approach requires that the transporting tool which transports the vehicle will have the ability to move, at least in the final stage of parking (and, accordingly, in the first stage of pulling out from parking) in a direction that is perpendicular to the longitudinal dimension of the parked vehicle. The second approach requires that the transporting tool which transports the vehicle will have the ability to move, at least in the final stage of parking (and, accordingly, in the first stage of pulling out from parking) in a direction that is parallel to the longitudinal dimension of the parked vehicle. In this description, the longitudinal dimension of a vehicle is referred to the dimension that is parallel to the direction of driving of the vehicle when it goes along a straight line. A central longitudinal imaginary line is referred to as the Imaginary line that is parallel to the direction of driving of the vehicle when it goes along a straight line and passes substantially in the center of the width dimension of the vehicle.

Some known methods of transporting a vehicle through the parking facility in an automated parking system involve lifting the car, typically through its wheels, to minimize risk of damage to the car, and after the car has been lifted from the floor, transporting it on the transporting tool according to the parking scheme to its parking location. When the parked car is about to be lifted from the floor by lifting its wheels, there is a need to adjust the distance between the lifting elements of the transporting tool to properly meet the wheels of the parked car. The adjustment need to address both different longitudinal distances between the front and rear axles/wheels and different lateral distances between the left and right pairs (or more than pairs) of wheels, in different car models.

There are two main methods of approaching a car to be lifted for later transporting it in the parking facility. According to the first method, the transporting tool rolls between the left and right wheels substantially along the longitudinal axis of the car, underneath the bottom of the car, and the lifting elements approach their respective wheels from the center longitudinal line of the car outwardly left and right. According to the second method, the transporting tool approaches the vehicle from the side, moving substantially perpendicular to the vehicle's longitudinal axis and is configured to provide lifting means that extend from the transporting tool perpendicular to the longitudinal axis of the vehicle. These lifting means need to extend from one side of the vehicle at least so as to reach the wheels of the vehicle on its other side. Accordingly, a transporting tool operating according to the second method is required to be equipped with side-extending supports to the floor, or be equipped with a counter-weight, in order to provide balancing means for the transporting tool when a vehicle is lifted and carried. Transporting tools operating according to the second method typically use a single lifting means for each lateral pair of wheels of the vehicle. For example, such lifting means may comprise a pair of parallel fork teeth spaced apart from each other enough to allow passing of each of the fork teeth on different sides of a wheel of a car without touching the wheel and close enough to each other to have the wheel held safely between the fork teeth when the fork is lifted from the floor.

In order to allow for the required adjustment of the location of each of the lifting elements with respect to its respective wheel in a transporting tool operating according to the first method, the transporting tool needs to be located accurately enough with respect to the vehicle to be carried. The required accuracy includes accurate enough distance between the front and rear lifting means, to match the distance between the front and rear axles of the vehicle. Further, the transporting tool needs to be placed centered with respect to the center longitudinal line of the vehicle and aligned with it accurately enough. The term accurate enough, as is used in this description, means accuracy that ensures that the vehicle with respect to which the accuracy is measured is safely placed on the transporting means and safely carried with it across any maneuver that may be required during the transportation of the vehicle. Accordingly, slow moving transporting means may allow for less accuracy, while fast moving transporting means may require higher level of accuracy due to lower tolerance for inaccuracy of placement of the vehicle on the transporting means due to higher mechanical forces acting on the carried vehicle during maneuvering of the transporting means. Another consideration that may have implication on the required accuracy of the transporting tool is the degree of compactness of utilization of a given parking area, meaning the ratio between the total area covered by parked vehicles in a given parking space and the total area of that parking space. The higher the ratio is (approaching 1), the higher need to be the accuracy of the transporting tool. The operational accuracy of a transporting means may be evaluated or measured with respect to at least to different reference frames. One reference frame is the vehicle to be carried, as discussed above. The other reference frame may be the parking space, with respect to which the transporting tool navigates when transporting a vehicle or when moving to do that. Each of the reference frames may dictate different levels of accuracy and each of the requirements may be addressed using different measuring means, location identification means and the like. For example, the accuracy of location of the transporting tool with respect to the vehicle before it is being lifted may dictate tolerance of no less than +/−2 cm, while the accuracy of location of the transporting tool with respect to traveling paths in the parking space may dictate tolerance of no less than +/−2.5 cm.

Several methods and devices are known in the art for measuring the relative locations of a lifting element with respect to its respective wheel(s). Once these respective locations are known, adjustment of the location of each of the lifting means can take place. The distances between left wheels and right wheels in vehicles that are expected to be parked in automated parking facilities vary between 130 cm and 190 cm, center to center, that is—relatively small variations. Accordingly, in several lifting methods and means known in the art, the lifting elements are planned and operated to be indifferent to this dimension, that is the solution for addressing lateral distance variations between front and/or rear wheels is actually built to provide a single answer to the entire range of lateral dimensions of the vehicles to be parked, without needing any adjustment, as long as the center longitudinal line of the transporting tool substantially coincides with that of the vehicle. Addressing the longitudinal variations, however, is more complicated, since the longitudinal variations of the longitudinal distance between the front and rear axles of vehicles that are expected to park in an automated parking facility are much bigger than the lateral variations. For example, the longitudinal distance between the front and rear axles may extend from 185 cm to 370 cm, center to center, according to some embodiments aimed to serve for parking cars and small trucks and, according to other embodiments, up to few meters in applications such as truck and bus automated parking systems.

Some solutions known in the art provide a transporting tool with an ability to extend or retract along its longitudinal dimension. Once the exact distance between front and rear axles has been acquired or measured or otherwise obtained, the transporting tool may position one pair of lifting elements aligned with one pair of wheels, for example the front wheels, and then adjust the distance between the front and rear lifting elements to match the distance between the front and rear wheels by extending or extracting, as may be needed. Such solution suffers of several drawbacks. First, it is typically limited in the range of change of the distance between the front and rear wheels. Second, this solution typically increases the complexity and price of the transporting tool due to the need to provide an extendible central element that is also suitable for supporting the typical mechanical loads exerted on such a central element especially during movement with loads such as a vehicle. Finally, a transporting tool functioning according to this solution has a dictated minimal length that is at least somewhat longer than the distance between the front and rear wheels. This length, in turn, dictates the maneuverability of the transporting tool and specifically its minimal turning radius, which is a major feature required in automated parking systems. For example, limited maneuverability limits the ability of such transporting tool to accurately track a traveling path and specifically its ability to quickly recover this path when the transporting tool deviates from that path. There is a need for a transporting tool that will maintain adjustment capability to large range of varying lengths of vehicles along with relatively high maneuverability.

SUMMARY OF THE INVENTION

An autonomous transporting tool (TT) is disclosed adapted to travel along a guiding line, the TT comprising a first and a second transporting tool element (TTE). Each of the TTEs comprises an autonomous propulsion means, a control system and an optical system comprising two cameras and two lighting units, wherein a first camera and a first lighting unit are located proximal to a first end of said transporting tool element and said second camera and said second lighting unit are located proximal to a second end of said transporting tool element, and wherein said first and second lighting units are direct to illuminate the field of view each of its respective camera. The system further comprises steering means to allow directing of said transporting tool element to directions between a rightmost and a leftmost steering angle, wherein communication means communicate at least with each other, wherein said first and second transporting tool elements are mechanically disengaged, and wherein said first and second transporting tool elements are adapted to communicate with each other via wireless communication channel to manage and control the distance between them and coordinate movements of the first and second tool elements. In the disclosed transporting system, at least one of said first and said second transporting tool elements further comprises distance measuring sensor adapted to measure the distance between said first and said second transporting tool elements.

A system is further disclosed for guiding at least one autonomous transporting tool (TT) adapted to travel along a guiding line comprising, the system comprising at least one autonomous transporting tool (TT). The TT comprises a first and a second transporting tool elements (TTE), wherein each of said transporting tool elements comprises an autonomous propulsion means, a control system and an optical system comprising two cameras and two lighting units, wherein a first camera and a first lighting unit are located proximal to a first end of said transporting tool element, and said second camera and said second lighting unit are located proximal to a second end of said transporting tool element, and wherein said first and second lighting units are directed to illuminate the field of view each of its respective cameras. The system further comprises steering means to allow directing of said transporting tool element to directions between a rightmost and a leftmost steering angle and communication means to communicate at least with each other, wherein said first and second transporting tool elements are mechanically disengaged and wherein said first and second transporting tool elements are adapted to communicate with each other via wireless communication channel to manage and control the distance between them and coordinate movements of the first and second tool elements. In the system, at least one of said first and said second transporting tool elements further comprises a distance measuring sensor adapted to measure the distance between said first and said second transporting tool elements.

A method for guiding an autonomous transporting tool (TT) along a guiding line is disclosed, comprising providing two TTE devices, each comprising an autonomous propulsion means, a control system, an optical system comprising two cameras and two lighting units, wherein a first camera and a first lighting unit are located proximal to a first end of said transporting tool element, and said second camera and said second lighting unit are located proximal to a second end of said transporting tool element, and wherein said first and second lighting units are directed to illuminate the field of view each of its respective cameras, steering means to allow directing of said transporting tool element to directions between a rightmost and a leftmost steering angle and communication means to communicate at least with each other.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
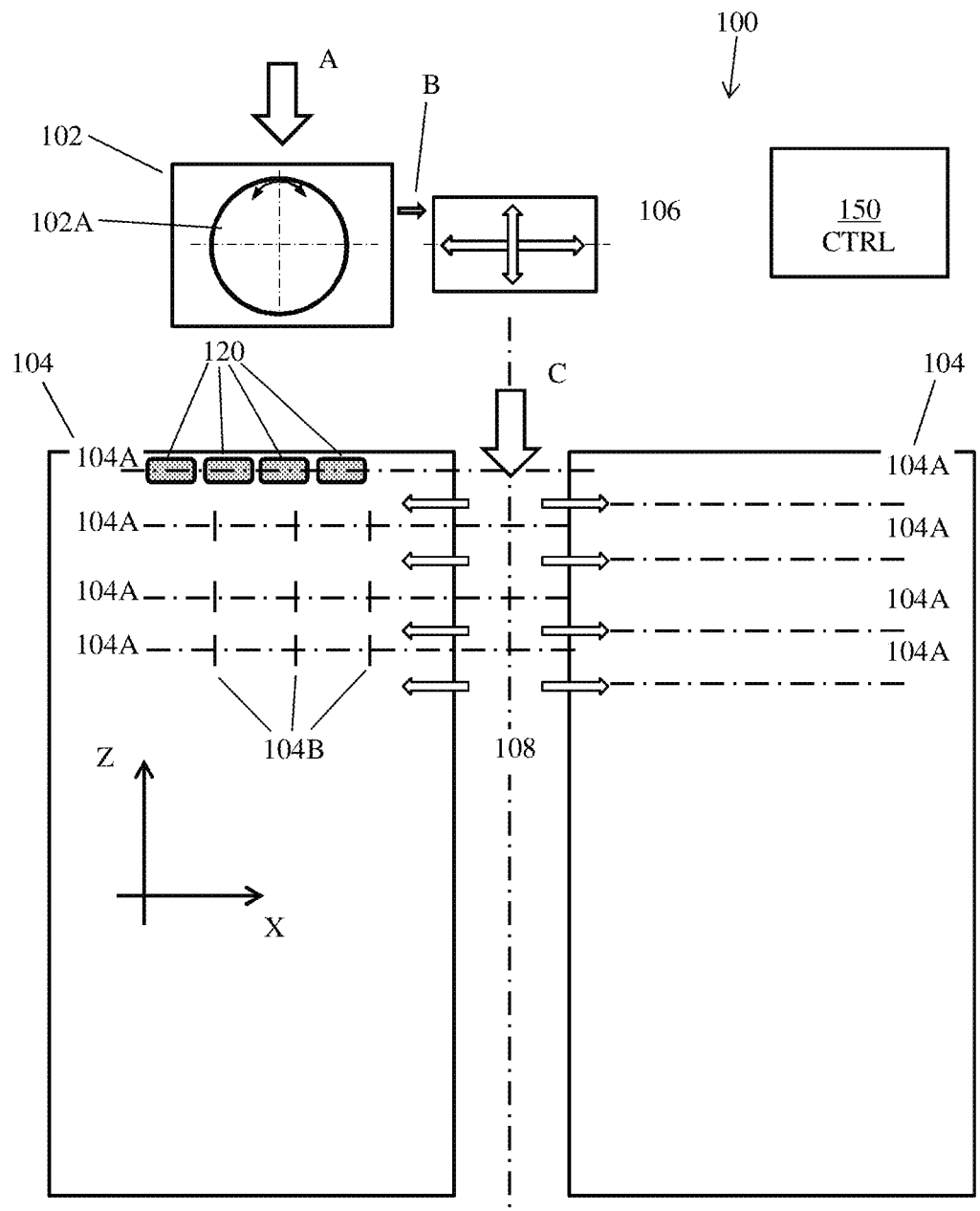
FIG. 1 is a schematic illustration of a typical automated parking space as known in the art.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

FIG. 1, to which reference is made now, schematically presents typical automated parking space 100. Parking space 100 comprises parking in/out unit 102, transport direction changer 106, and parking area(s) 104 each having a plurality of parking lines 104A and longitudinal traveling path 108. Parking space may have a plurality cars 120 parked in it along parking lines 104A. Parking in/out unit 102 may be adapted to accommodate an incoming vehicle driving into it substantially along arrow A. When the specific conditions in parking space 100 require, parking in/out unit 102 may comprise vehicle direction adapter 102A that may be adapted to turn incoming/outgoing vehicle to a desired direction, different from the direction of the vehicle when entered into unit 102, for example—from the direction of arrow A to the direction of arrow B. When the conditions of parking space 100 dictate, transport direction changer 105 may be part of in parking space 100, adapted to receive a vehicle from in/out unit 102 traveling along one direction (for example the direction parallel to arrow B), change location to be aligned with the direction of traveling path 108, and travel with a vehicle along path 108 until it stops aligned with a desired parking line 104A. Returning a vehicle from its parking place may be done in the opposite order of steps. When incoming vehicle has been placed along path 108 aligned with a desired parking line 104A, it may be carried from there to its parking place by a transporting tool (not shown). Such transporting tool, whether traveling along path 108 or line 104A, is required to follow that line accurately, in order to ensure high utilization of the parking place, high compactness of parking of vehicles and tight tolerance of the traveling accuracy. Assuming that parking lines 104A are located within distance from each other that ensures the above [make sure that this is what you mean], it is apparent that a transporting tool that travels along such a line needs to be able to accurately follow that line since the clearance left on both sides of a transported vehicle traveling along such line needs to be kept as small as possible.

Parking space 100 further comprises central control unit 150 adapted to control the operations involved in operating the parking space, including controlling receipt and discharge of vehicles to/from parking space 100, keeping an updated map of the parking location of each parked vehicle, the locations of unoccupied parking locations, the dimensions of an incoming vehicle, etc. Central control unit 150 may be adapted to calculate traveling lines/paths from the entrance of the parking space to the assigned parking location; from the parking location to the discharge point; transportation schemes planned to enable a transporting tool that is adapted to transport a vehicle to move away parking vehicles that are on the way to another parking vehicle that needs to be discharged. Central control unit comprises non-transitory storage unit, central processing unit (CPU), communication means for communicating with transporting tool(s), with the receipt and discharge stations, with payment means for monitoring payment for the parking services, and the like.

According to some embodiments of the present invention, a transporting tool that is used for parking a vehicle in a parking location along line 104A is adapted to receive a vehicle from another device traveling along line 108. In some embodiments, the transporting tool may be carried by the other transporting device along line 108, and be placed on line 108 next to, or on the beginning of, line 104A. The transporting tool is oriented substantially with line 104A. When the transporting tool is placed at the intersection of lines 108 and 104A, it may begin its travel towards the designated parking location along line 104A. The travel along line 104A may be monitored using, for example, encoder connected, for example, to one of the wheels of the transporting tool. The resolution of the encoder may be sufficient to enable the transporting tool to accurately arrive at the parking location. In some embodiments, lines 104A may be partitioned along them by lines 104B that may be spaced apart from each other by equal distances. When the transporting tool travels along travel line 104A using, for example, optical tracking means, lines 104B may be identified and used for resetting the readings from the encoder, thus eliminating the accumulating error. When the transporting tool travels along line 104A after parking a vehicle, or when it travels along travel line 104A for approaching a vehicle for taking it from its parking location, the same method of monitoring the progress along line 104A may be used.

Figure 2A:
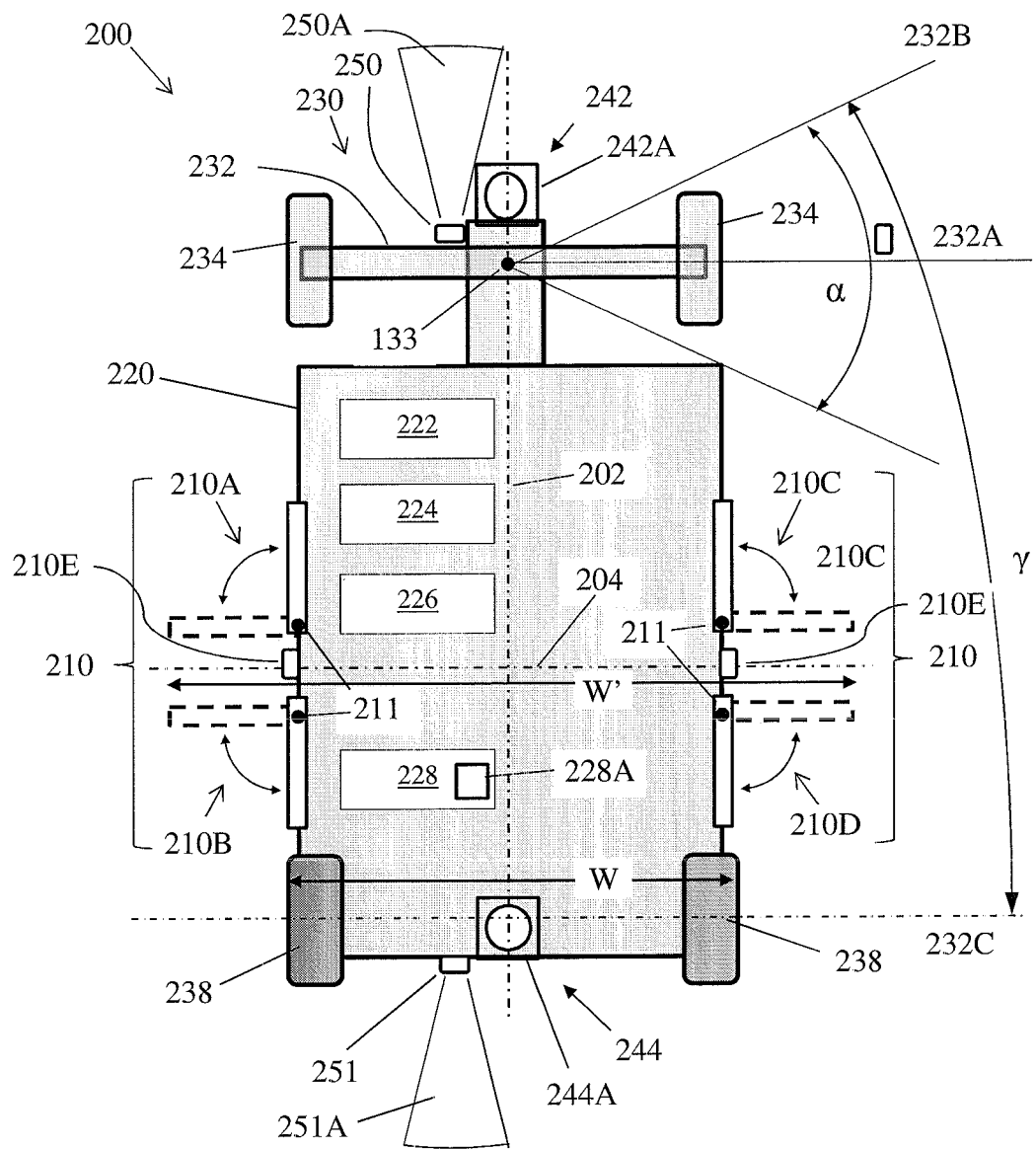
FIG. 2A schematically describes a transporting tool element serving as part of a transporting tool, according to some embodiments of the present invention.

Reference is made now to FIG. 2A schematically describing transporting tool element (TTE) 200, serving as part of a transporting tool, according to some embodiments of the present invention. Transporting tool element may also be described as a cart, shuttle or trolley, where all these terms are meant to generally describe a low profile, self-motorized and steerable transporting means adapted to lift from the floor on which the TTE is located at least one tire of a car, move with a load such as a car resting on its tires on the TTE, and place the at least one tire on the floor—all in a controllable manner. TTE 200 may comprise main body unit 220 and steering mechanism 230. Main body 220 comprises at least one pair of wheels 238, and at least two pairs of lifting elements 210, which comprise lifting elements 210A, 210B, 210C and 210D. Lifting elements 210 may be, according to one embodiment, a rod pivotally connected, via pivot 211, to main body 220 on one of its sides and adapted to rotate about pivot 211 to a stowed position parallel to longitudinal central line 202 (drawn in solid line) or to a lifting position perpendicular to line 202 (drawn in dashed line). Each pair of lifting elements 210A and 210B, or 210C and 210D is adapted to rotate away from each other when stowed and to rotate towards each other when in lifting position. The distance between two respective lifting elements of a pair of lifting elements is set to be smaller than the diameter of the smallest expected vehicle wheel to be lifted. This distance is further set so that when two respective lifting elements get closer to each other on the movement to lifting position, the respective vehicle's wheel is lifted from the floor due to the distance between the lifting elements that is made smaller and smaller until the lifting elements are parallel to each other, at which position the respective vehicle wheel rests on the pair of lifting elements with its lowest point between them and above the floor, as described in details, for example, in US Patent Appl Publ. No. 2013/0251481 for the applicant of the current application. The width W of TTE 200 at its maximal width point when the lifting elements are in stowed position is set to be less than the minimal expected distance between two respective wheels (rear wheels or front wheels) of a vehicle to be serviced by a transporting tool according to some embodiments of the present invention. The maximal width W' of TTE 200 when the lifting elements are in lifting position is set to be larger than the maximal outer dimension of a vehicle to be serviced measured from outer face of a wheel to the outer face of the respective wheel on the other side of the vehicle. An imaginary lateral line 204 passes in the center between two respective lifting elements 210A and 210B; and 210C and 210D, and perpendicular to line 202. When TTE 200 is moved to lifting position, lateral line 204 substantially coincides with an imaginary line passing between the points where two respective wheels of a vehicle (either front wheels or rear wheels) touch the floor. Lifting elements 210 may further comprise optical lateral sensors 210E positioned on the sides of body 220 and on central line 204 and positioned to sense away from body 220. Lateral sensors 210E are adapted to provide optical signal enabling controller 222 to determine the exact positioning of TTE 200 in a position to lift a vehicle's wheel, based on an image including at least the lower portion of the vehicle's wheel and a portion of the floor it touches.

Steering mechanism 230 may enable steering of TTE 200 left—straight—right with respect to a line coinciding with longitudinal lie 202. According to one embodiment of the present invention, steering mechanism 230 may comprise two wheels 234 connected to axle 232 pivotally connected in its center to main body 220 by pivot 133. Each one of wheels 234 may be separately motorized by a respective motor, such as an electric motor (not shown to avoid obscuring the drawing). Each of the electric motors may drive its respective wheel 234 in a specific rotations-per-minute (RPM) speed. When both wheels 234 are driven at the same RPM speed and the same direction of rotation, axle 232 will tend to move along a line that is perpendicular to axle 232 center line 232A. When wheels 234 are driven at different relative turning speeds but in the same direction of rotation, axle 232 will tend to rotate about pivot point 133 so that the faster wheel performs longer a traveling path and so that the angular speed of both wheels 234 is equal, as is known in the art. The steering range of steering mechanism 230 may be defined by angle α defining the angle between the two extremum possible positions of axle 232 when turned to the left and to the right about pivot point 133. When other steering mechanisms are used, as is known in the art, the maximum steering range may be defined according to the chosen steering mechanism. The speed and direction of rotation of wheels 234 may be controlled separately by controller 222 as is explained in detail below. It will be noted that other steering mechanisms may be used to steer transporting tool element 200. The steering range may be defined by angle γ defined between line 232B that coincides with the direction of axle 232 in its maximal steering range and line 232C crossing through the center of the other wheels 238 of transporting tool element 200. When the other steering mechanism is used, the same definition applies with the required changes.

TTE 200 comprises at least two optical units 242 and 244 installed at or proximal to the edge of TTE 200 close to wheels 234 and at or proximal to the edge of TTE 200 close to wheels 238, respectively. Both optical units are installed on center line 202 so that center line 202 crosses in the middle of the fields of view (FOV) 242A, 244A, respectively, of each of optical units 242, 244. TTE 200 is adapted to travel on a plane, such as a floor of parking garage.

When each of wheels 234, 238 touches the floor, the side of TTE 200 facing the floor is defined as the bottom face of TTE 200, the side of TTE 200 parallel to the bottom face is defined as the top face of TTE 200, the faces of TTE 200 defined between the bottom and top faces and parallel to longitudinal line 202 are defined right face and left face, as seen when looking on TTE 200 facing the top face and in the direction of wheels 234.

Optical units 242 and 244 are installed so that FOV 242A and 244A facing substantially towards the floor when TTE 200 is placed on the floor on its wheels. Optical units 242 and 244 may also be equipped with lighting means, such as light units of any desired kind that may emit light in any desired range of wavelength, as is known in the art, in order to illuminate the scene within the FOV of the respective optical unit. Optical units 242 and 244 are adapted to provide video or fast streaming of still images of the floor underneath them. Images taken by optical units may be transmitted to controller 222, as is explained in detail below.

TTE 200 comprises at least one range detector 250, 251. Range detector 250 may be located at, or proximal to, the edge of TTE 200 close to steering mechanism 232 Range detector 251 may be located at, or proximal to, the edge of TTE 200 close to wheels 238 Range detector 250 has operative range of detecting 250A defined by specific detection range and spatial beam angle. Range detector 251 has operative range of detecting 251A defined by specific detection range and spatial beam angle. According to some embodiments, the detecting range and angels of range detectors 250 and 251 may be substantially the same. Range detectors 250, 251 may have, according to some embodiments of the present invention, operational detection range of 2 cm to 2.5 m with +/−1 cm resolution and spatial detection angle of approx. 0.2 deg. around an imaginary central line directed substantially parallel to the longitudinal line of TTE 200. The required accuracy of range maintaining is in the magnitude of 2 cm. Accuracy of range maintaining means the range of change in the distance between two coupled TTEs operating together. This accuracy depends on the accuracy of the range detectors, on the swiftness of the control system and the responsiveness of the mechanical elements of TTE 200. Range detector 250, 251 may be any range detector providing the performance defined above, such as sensor DT35 manufactured by Sick AG from Germany.

TTE 200 may comprise controller 222 adapted to be in active communication with steering mechanism 230, with lifting elements 210, with optical units 242 and 244 and with range detector's 250, 251. Controller 222 may be, or may comprise, a central processing unit (CPU), a programmable logic controller (PLC), a central controller or similar controlling unit adapted to perform steps and operations according to programs executed by the controller. Controller 222 is adapted to receive steering angle status from steering mechanism 230 and to set a momentary steering angle of steering mechanism 230, in order to cause TTE 200 to follow a specific traveling path, and/or to correct its actual traveling path towards a desired traveling path, if deviation from the desired traveling path has been detected, as is discussed herein below. Controller 222 is further adapted to adjust the location of central lifting line 204 with respect to pair of wheels of a vehicle to be lifted by TTE 200, for example by commanding wheels 234 and 238 to move TTE 200 to "forward direction" (i.e., the direction in which wheels 234 are leading) or to "backwards direction" (i.e., the direction in which wheels 238 are leading).

Controller 222 is adapted to operate optical units 242, 244 so as to acquire images of the floor in the FOV 242A, 244A respectively and to provide these images to controller 222.

Controller 222 is further adapted to operate range detector's 250, 251 so as to provide range between each of range detectors 250, 251 and bodies in the respective range and spatial beam detecting range 250A, 251A.

TTE 200 further comprises non-transitory storage means 224 adapted to store software programs, data, temporary data elements and the like. Non-transitory storage means 224 may be any known kind of storage means, as is known in the art. Controller 222 is adapted to communicate with storage means 224 in order to read from it and to write to it respective programs, data and the like.

TTE further comprises communication unit 226 adapted to communicate wirelessly with other TTE 200 units and/or with central control unit of a parking space. Communication unit 226 is adapted to be in active communication with controller 222 in order to receive communication requests from controller 222 and to transmit them to the required receivers, and to provide data and/or control commands received over a communication channel from central control unit and/or from other TTE 200 unit(s). According to some embodiments, communication unit 226 may operate more than one communication means over more than one communication channels. For example, communication unit 226 may communicate with another communication unit 226 on another TTE 200 over one communication channel, implementing, for example one or more of the following protocols: TCP\IP, RS 232, RS 485, CANopen, CAN bus, MODBUS IP and MODBUS of Schneider Electric Inc, and with a central control unit of a parking space over another communication channel, for example TCP\IP.

TTE 200 further comprises power source unit 228, adapted to provide the power required for the operation of TTE 200 in all of its modes of operation. Power source unit 228 may be or may comprise battery or batteries 228A that may be rechargeable. Power source unit may be adapted to provide all of the required electrical power between one recharge session and the next recharge session. The rechargeable batteries of power source 228 may be of any desired type, and may be planned and built to provide the required weight/available electrical power between recharges ratio that meet the requirements of operation of TTE 200. The available power required for the operation of TTE 200 may be calculated according to statistics of a specific parking space considering the average and maximal length of operating periods and the average and maximal total weight of served vehicles versus the average and minimal length of non-operating periods (which dictate the available time for recharging the batteries). According to some embodiments of the present invention, power source 228 may be monitored and controlled by controller 222 in order to ensure optimal consumption of the power accumulated in power source 228 and in order to protect power source 228 from overuse that may shorten the service period of power source 228.

According to some embodiments of the present invention, main body 220, steering mechanism 230 and lifting elements 210, as well as wheels 234 and 238 and their respective driving means, may be substantially equivalent or analogous to the respective units and elements of shuttle 100 described in US Patent Appl. Publication No 2013/0251481, co-owned by the owner of the present invention.

Figure 2B:
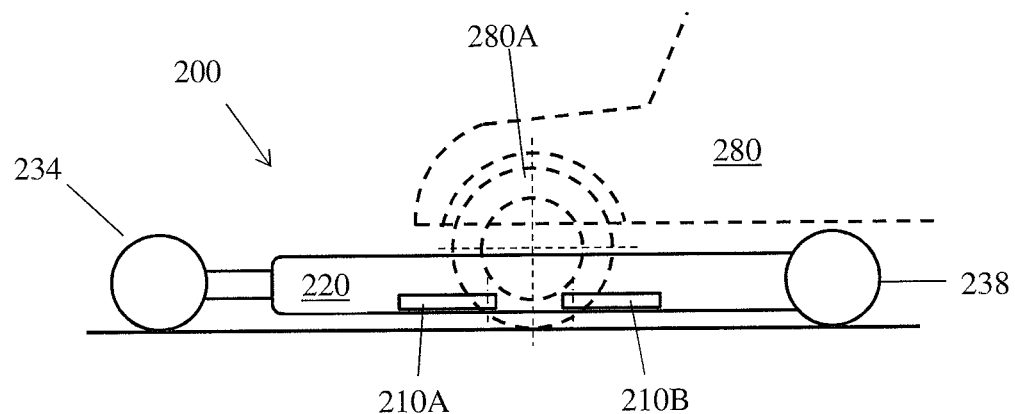
FIGS. 2B and 2C schematically illustrate a TTE of FIG. 2A in side view in position for lifting a vehicle before lifting and after lifting, respectively, according to some embodiments of the present invention.
Figure 2C:
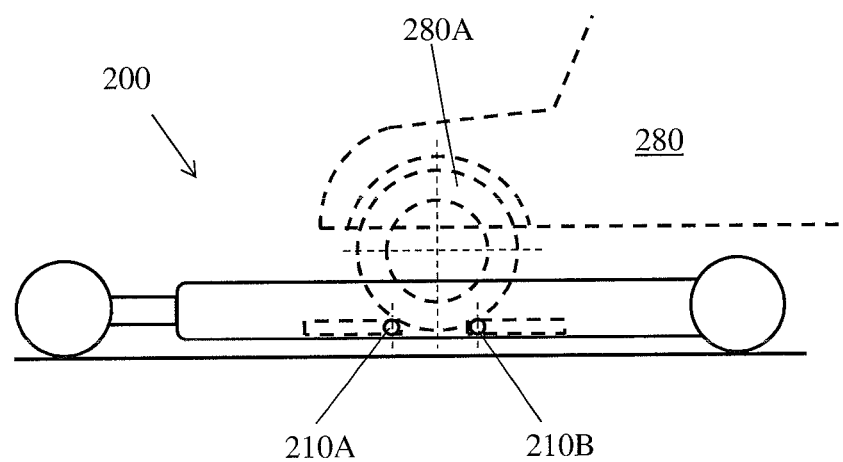

Reference is made now to FIGS. 2B and 2C which schematically illustrate TTE 200 of FIG. 2A in side view in position for lifting a vehicle before lifting and after lifting, respectively, according to some embodiments of the present invention. As described with regard to FIG. 2A, TTE 200 may be moved under the bottom of vehicle 280 and between its left and right wheels to position so that lateral line 204 is aligned with an imaginary line passing between the points where two respective wheels 280A of vehicle 280 touch the floor (symbolized by point 281). In order to lift vehicle wheels 280A, lifting elements 210A, 210B may be rotated about pivots 211 towards each other, thus shortening the distance between them until they touch the outer circumference of wheels 280A, and when lifting elements 210A, 210B get closer to each other wheels 280A are lifted from the ground and rest on lifting elements 210A, 210B.

Figure 3:
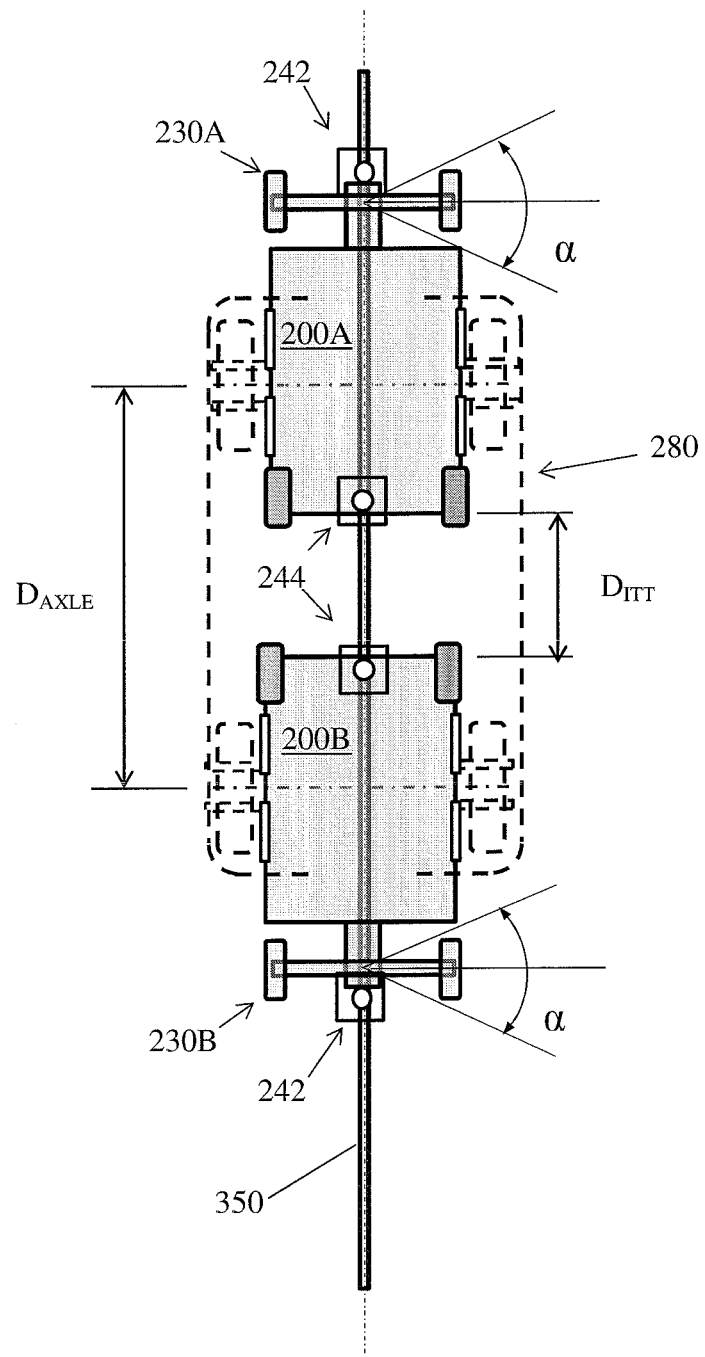
FIG. 3 schematically illustrates a transporting tool (TT), according to some embodiments of the present invention.

Reference is made now to FIG. 3 which schematically illustrates transporting tool (TT) 300, according to some embodiments of the present invention. Transporting tool comprises two TTEs 200A and 200B. Each of TTE 200A and 200B may be identical or similar to TTE 200 described with reference to FIGS. 2A, 2B and 2C. TTE 200A and TTE 200B may be located in line with each other so that the longitudinal central line of both coincide or are close to each other in direction and in distance. The rear wheels of one of the TTEs are facing the rear wheels of the second TTE. Rear wheels here relate to the wheels farther from the steering mechanism, and front wheels relate to the wheels closer to the steering mechanism or to wheels that are part of the steering mechanism, regardless of a momentary direction of movement of the respective TTE. It will be noted that other mutual positions may be used according to some embodiments of the present invention. In a TT configuration of two TTEs, the TTEs are mechanically disengaged but adapted to move together, as explained below. When in movement, the TTEs may move so that one TTE follows the other one, the distance between the TTEs is tightly maintained in the required magnitude, for example as dictated by the carried vehicle and both TTEs are operated to follow a travel line. TTE 200A may be controlled to be located in position for lifting a first pair of wheels 280A and TTE 200B may be controlled to be located in position for lifting a first pair of wheels 280B. TTE 200A and TTE 200B may be controlled by controllers, such as controller 222 of FIG. 2A. Further, controllers 222 of TTEs 200A and 200B may communicate to control the distance $D_{ITTE}$ between them so as to bring the distance between lines 204 of TTE 200A and of TTE 200B equal to the distance $D_{AXLE}$ between the front and rear axles of vehicle 280. Once transporting tool 300 is located properly with respect to the wheels of vehicle 280, the vehicle may be lifted from the floor, for example as described above with regard to FIGS. 2B and 2C. When in routine operation, vehicle 280 is located on the floor of the parking space with its longitudinal central line substantially overlapping travel line 350, possibly with relatively small deviations. Small deviations in this context will be considered deviations that allow the image of at least part of the width of travel line 350 be included in each of the images of cameras 242, 244 of both TTEs 200A and 200B.

Figure 4B:
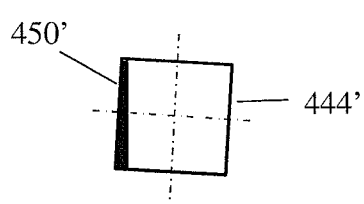
FIGS. 4A, 4B and 4C schematically present situations of deviation of a TTE from a travel line and the respective image as received in optical units installed on the TTE, according to some embodiments of the present invention.
Figure 4C:
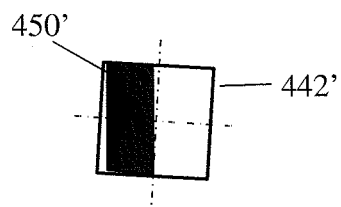
Figure 4A:
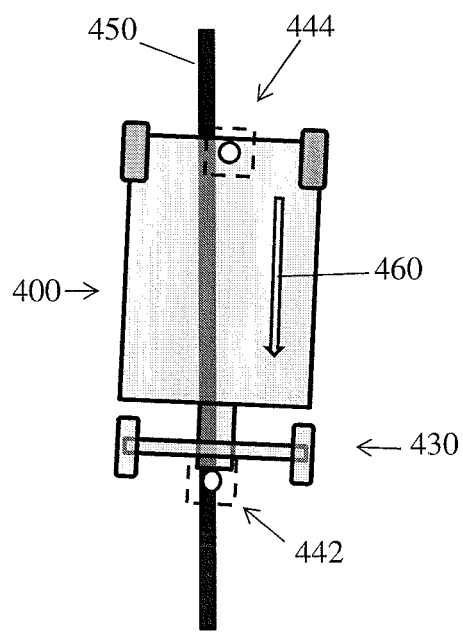

Reference is made now to FIGS. 4A, 4B and 4C which schematically present situations of deviation of TTE 400 from travel line 450, the respective image 444' as received in optical unit 444 and respective image 442' as received in optical unit 442, respectively, according to some embodiments of the present invention. As seen in FIG. 4A, TTE 400 is located off travel line 450 so that the center of its rear part is located away from travel line 450 more than the center point of its front part. Both deviations, that of the front part and that of the rear part, are considered small deviations, since, in the respective images 442' and 444', at least portion of the image 450' of travel line 450 is seen. Accordingly, the portion of image 450' of travel line 450 as seen in image 444' is thinner and occupies less are compared with image 450' in image 442' Both images may be processed by a controller of TTE 400 (not shown), which may be similar or equal to controller 222 of FIG. 2A. Assuming that the current travel direction is presented by arrow 460, the controller may conclude that TTE 400 is getting closer to travel line 450 as it travels.

Figure 5B:
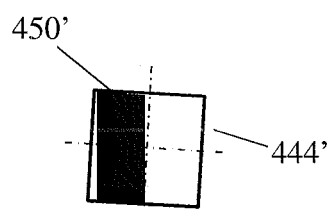
FIGS. 5A, 5B and 5C schematically present deviation of a TTE from a travel line, the respective images as received in optical units installed on the TTE after TTE 400 travels certain distance from the location described in FIG. 4A, according to some embodiments of the present invention.
Figure 5C:
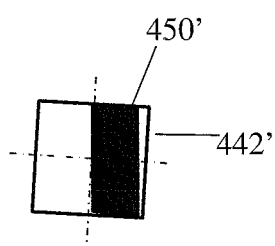
Figure 5A:
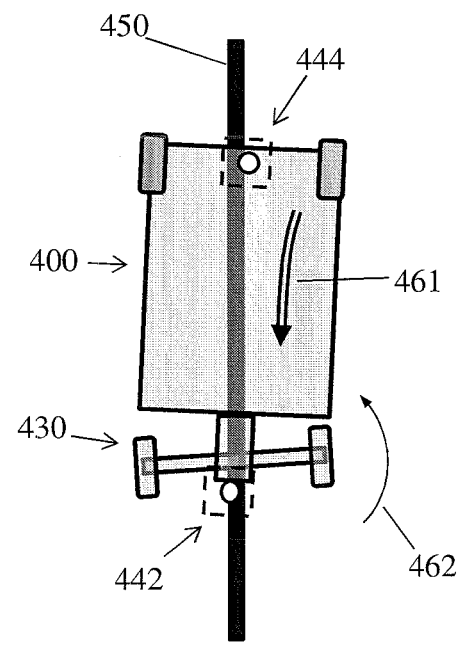

Reference is made now also to FIGS. 5A, 5B and 5C which schematically present deviation of TTE 400 from travel line 450, the respective image 444' as received in optical unit 444 and respective image 442' as received in optical unit 442, respectively, after TTE 400 travels certain distance from its location described in FIG. 4A, according to some embodiments of the present invention. Due to the oncoming of TTE 400 towards travel line 450, the relative location of travel line in the FOV of optical units 442 and 444 changes, and its image 450' occupies larger area in images 444' and 442', and the location of image 450' in images 444' and 442' is closer to the center. As the image 450' of travel line 450 in image 442' crosses the center of the image, the controller that controls the travel of TTE 400 may begin to steer TTE 400 to straighten with travel line as is depicted by arrow 461, for example by steering mechanism 430 in the direction depicted by arrow 462. In accordance with the line tracking process described above, TTE 400 may autonomously track a travel line, such as travel line 450 with relatively high accuracy, for example by taking the necessary amount and repeating steering actions in order to keep the image 450' of travel line 450 in the middle of images 442' and 444' as long as possible.

Figure 6B:
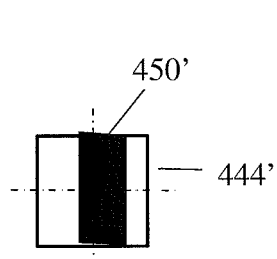
FIGS. 6A, 6B and 6C which schematically present end of correction of deviation of a TTE from a travel line and the respective images as received in optical units installed on the TTE after the TTE travels certain distance from its location described in FIG. 5A, according to some embodiments of the present invention.
Figure 6C:
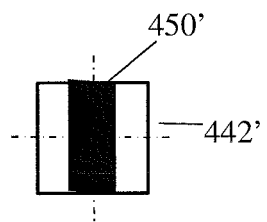
Figure 6A:
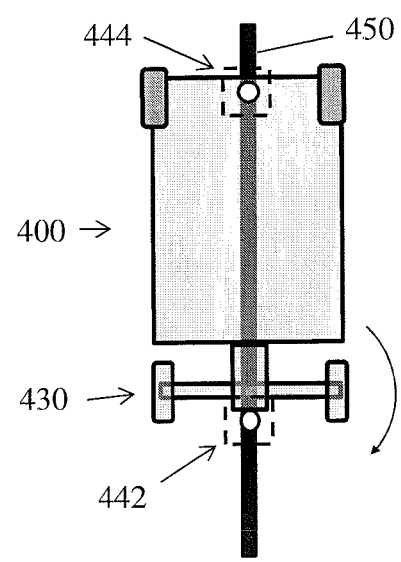

Reference is made now also to FIGS. 6A, 6B and 6C which schematically present end of correction of deviation of TTE 400 from travel line 450, the respective image 444' as received in optical unit 444 and respective image 442' as received in optical unit 442, respectively, after TTE 400 travels certain distance from its location described in FIG. 5A, according to some embodiments of the present invention. As seen, images 450' of travel line 450 in both images 442' and 444' are substantially in the middle of the image frame, and the correction step has therefore finished. At this stage, the controller of TTE 400 may switch to fine steering mode in which steering commands are small in amount and slow in time.

It will be appreciated that optical units 442 and 444 may comprise monochrome optical sensor or color optical sensor. When color optical sensor is used, different line tracking schemes may automatically be used for lines of different colors. Alternatively or additionally, the use of color optical sensor may enhance the readability and resolution of images of the images of the floor as background and the travel line as the target of the imaging process. For example, the use of color optical sensor may assist in identifying the image of a travel line in the frame of the image of the optical unit even with deteriorated lighting conditions. In the case of large deviation of TTE 400 from track line 450, so that in the frames of images 442' and 444' there is no representation of the image 450' of line 450, the controller of TTE 400 may rely on the information comprised in the position of the image 450' of line 450 in each of images 442' and 444' as last seen and take correcting actions to the direction derived from this information. In such cases, the beginning of the travel corrections may involve more vigorous steering measures, for example at least until some portion of image 450' appears in the frame of image 442' or 444'—the one that is calculated to be closer to track line 450.

Control by the TTE control unit, such as unit 222 of TTE 200, operating in a configuration of 2 coupled TTEs, such as TTE 200, operating as a single TT, such as TT 300 or TT 700, may comprise carrying out the following control functions:

- tracking a travel line and correcting to the travel line in case of deviation from it—of each TTE alone and of the TT as a whole, as will be explained in details below;
- maintaining the distance between the couple of TTEs in the required dimension during travel without a carried vehicle, with a carried vehicle and during setting the distance to match the distance between front and rear axles of the carried vehicle before it is lifted onto the TT;
- performing the travel scheme, as received from a centralized control system, including stopping at the lift up position, traveling to the put down position traveling to an idle position, traveling to a batteries recharge station, and the like;
- monitoring the health status of the batteries, planning recharge sessions and informing the centralized control system of same;
- according to some embodiments of the present invention, one of the two TTEs forming the TT may operate as a 'master' TTE, and the other TTE will operate as a 'slave' TTE. In such a configuration, the TTE defined 'master' masters the travel direction and speed, while the 'slave' TTE operates to follow the 'master' TTE based on data exchanged between the TTEs wirelessly. A TTE may be defined as 'master' according to several considerations. For example, the TTE leading the travel at a certain travel leg may be defined 'master' The TTE acting as a 'master' may receive travel destination, travel lines scheme and the like from a central control unit such as central control unit 150 (FIG. 1). The central control unit may control the mode of operation of a TT. Modes of operation of a TT may be Automatic, Manual, Pause and Stop. In automatic mode, the TT follows the travel commands, such as the next destination, whether a vehicle is to be lifted or otherwise, the travel line scheme to the destination and the like, as received from the central control unit. The traveling, the tracking of the travel line, the maintaining the required distance, the performing of lift up of a vehicle or a put down of a vehicle, the monitoring the health of the batteries and the like are controlled by control units of the TTEs, such as control unit 222 of TTE 200. Other modes of operation—manual, pause and stop are useful in maintenance of the system, in calibration, and the like.

Figure 6D:
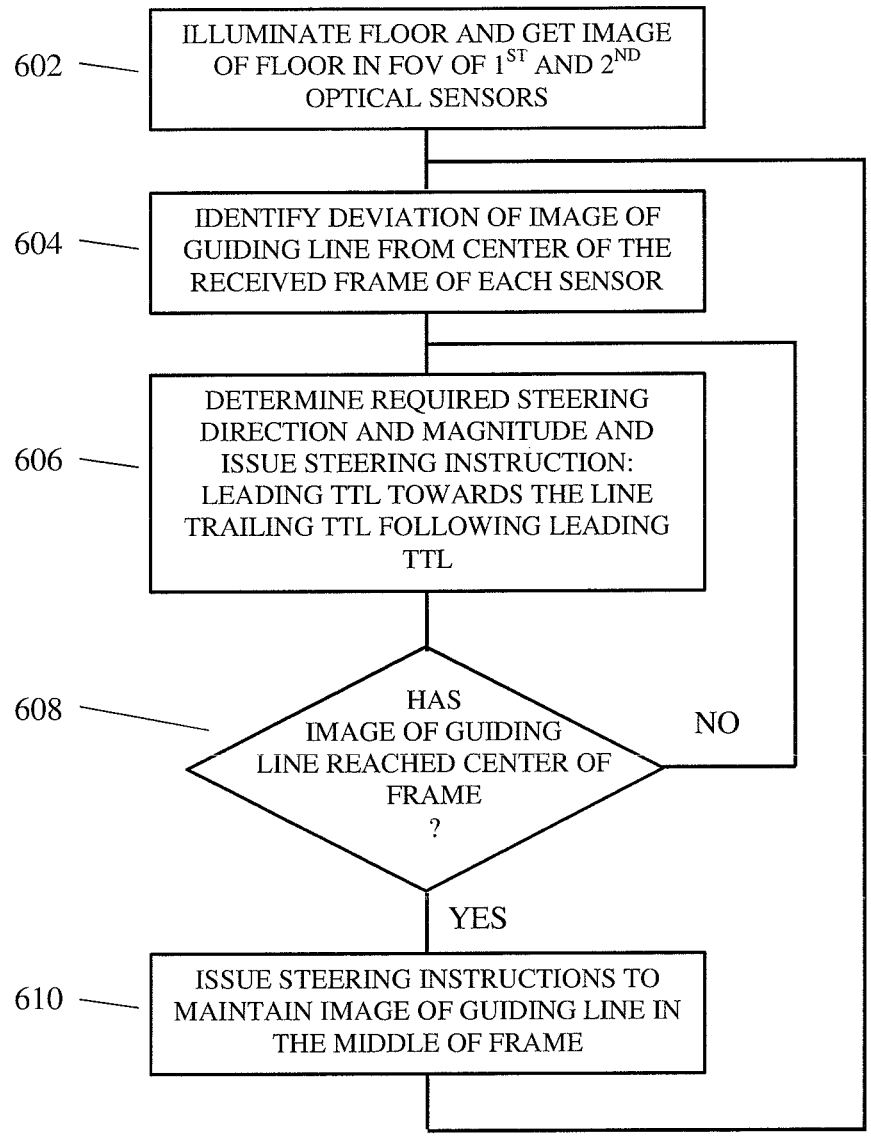
FIG. 6D is a schematic flow diagram illustrating method of guiding a TTE towards a guiding line according to some embodiments of the present invention.

Reference is made now to FIG. 6D which is a schematic flow diagram illustrating method of guiding a TTE, such as TTE 400 of FIGS. 4A, 5A and 6A, towards a guiding line, such as guiding line 450 of FIGS. 4A, 5A and 6A, according to some embodiments of the present invention. TTE 400 illuminates the floor positioned against optical units 442, 444 (block 602) using lighting means associated with the optical units. In the images received from the optical units, the processor, such as processor 222 of FIG. 2A, is adapted to identify the location of the image of the guiding line within the flame of the received image and to estimate the deviation of the image of the guiding line from the center of the received image frame (block 604). The processor is further adapted to extract, based on the direction of the deviation with respect to the center of the image flame (right/left) and its magnitude, steering instructions and to issue them to the steering mechanism, such as steering mechanism 230 of FIG. 2A. In a TT comprising two TTEs, the leading TTE will receive steering instructions that will lead to decreasing the deviation of the image of the guiding line from the center of the image frame, and the trailing TTE will receive instructions that will lead it to follow the leading TTE (block 606). The travel line correction process may be checked relatedly, for example once every command cycle of the processor, e.g., every 20 ms. The deviation is checked repeatedly (block 608). When the deviation exists (NO) the operations of block 606 are repeated. When the processor identifies that the deviation is substantially small (YES), that is the deviation is smaller than a predefined value, the cycle of operations may be redirected to block 504, in order to continuously asses the deviation of the TTE from the guiding line, by assessing the deviation of the image of the guiding line from the center of the image frame. It will be apparent to those skilled in the art that the process described above may need to be continuously performed due to the nature of a mechanical device such as the TTE to be unstable with respect to its line of travel, at least to an extent.

Figure 7:
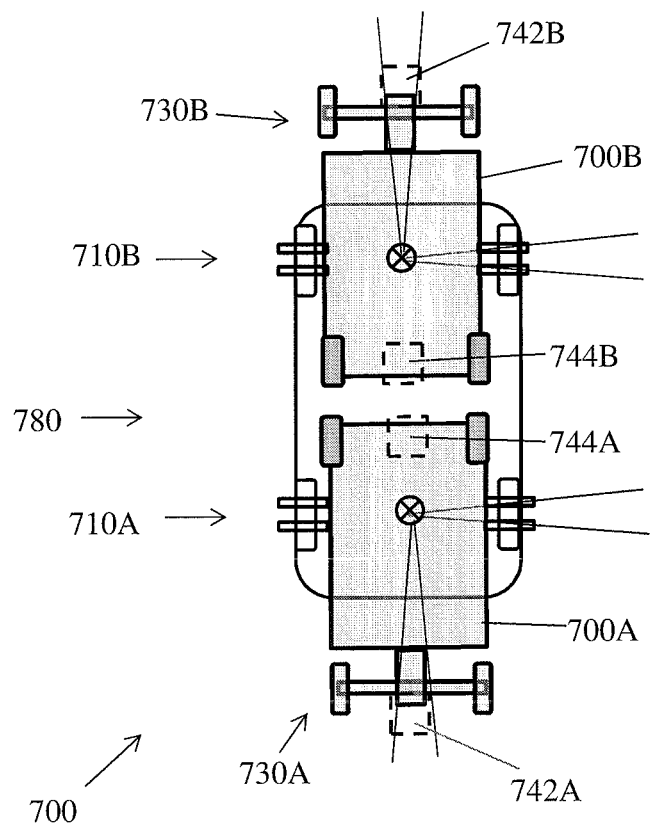
FIG. 7 schematically presents a transporting tool (TT) according to some embodiments of the present invention.

Reference is made now to FIG. 7 which schematically presents transporting tool (TT) 700 according to some embodiments of the present invention TT 700 comprises two TTE 700a and 700B, each built and operating similar to TTE 200 and TTE 400 described above. When in the formation of transporting a vehicle, TTE 700A and TTE 700B are located substantially aligned and in a distance between them to accommodate the distance between the front and rear axles of that vehicle, as seen in FIG. 7. Vehicle 780 is shown loaded and resting on TTEs 700A and 700B so that one pair of wheels of vehicle 780 rests on lifting elements 710A, and the other pair of wheels rests on lifting elements 710B. It will be appreciated that in this formation certain yet small amount of flexibility in the location and in the relative direction of TTE 700B with respect to that of TTE 700A may be allowed, as much as the deviation of any of the wheels of vehicle 780 from the center line of the respective pair of lifting elements of lifting elements 710A and/or 710B will not lead to the sliding of that wheel off that pair of lifting elements. This flexibility may be used to compensate for certain small glitches in the maintaining of the relative location of TTEs 700A and 700B with respect to a travel line when transporting a vehicle. This flexibility may also be used to enable small intentional deviations of the direction of TTE 700A with respect to that of TTE 700B, which may be caused to enable small steering operations, as is explained in detail below.

Figure 8A:
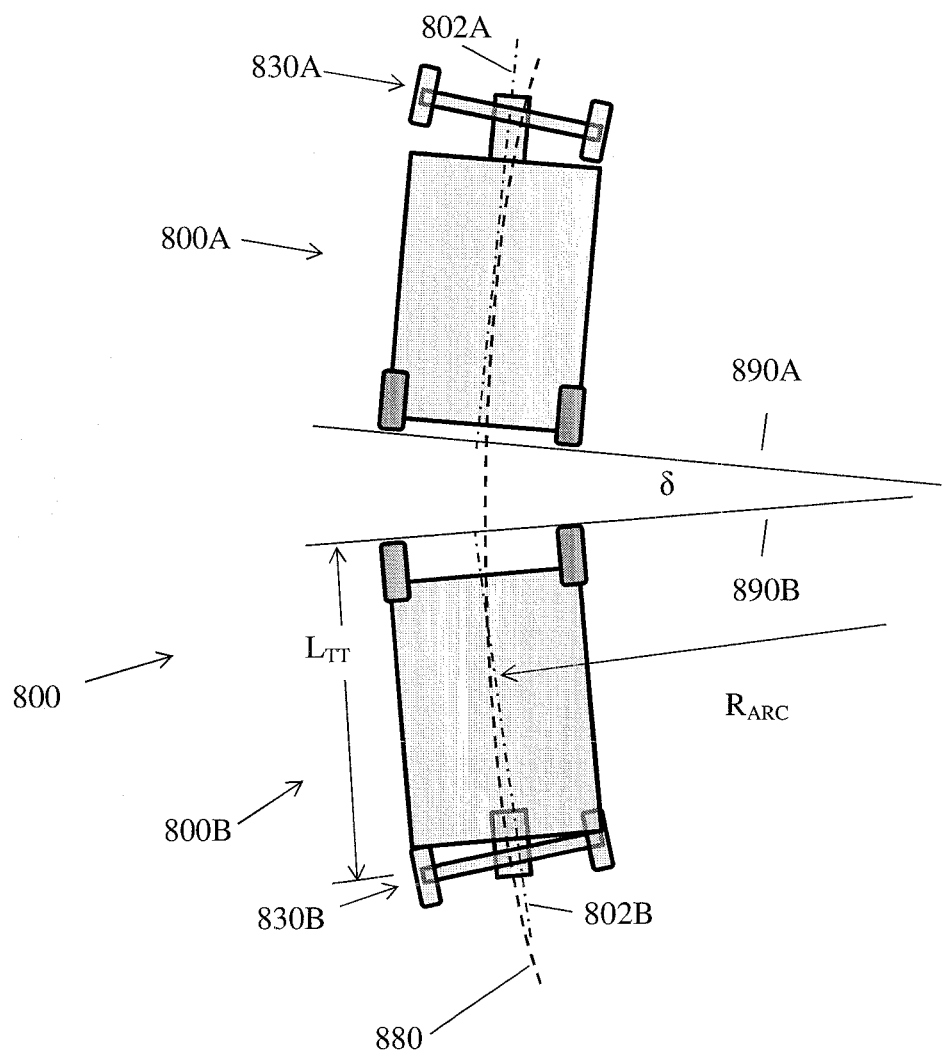
FIGS. 8A, 8B and 8C schematically depict methods of maneuvering of a TT with respect to a travel line when no vehicle is carried, when a vehicle is carried and only one steering mechanism is used and when a vehicle is carried and two steering mechanisms are used, respectively, according to some embodiments of the present invention.
Figure 8B:
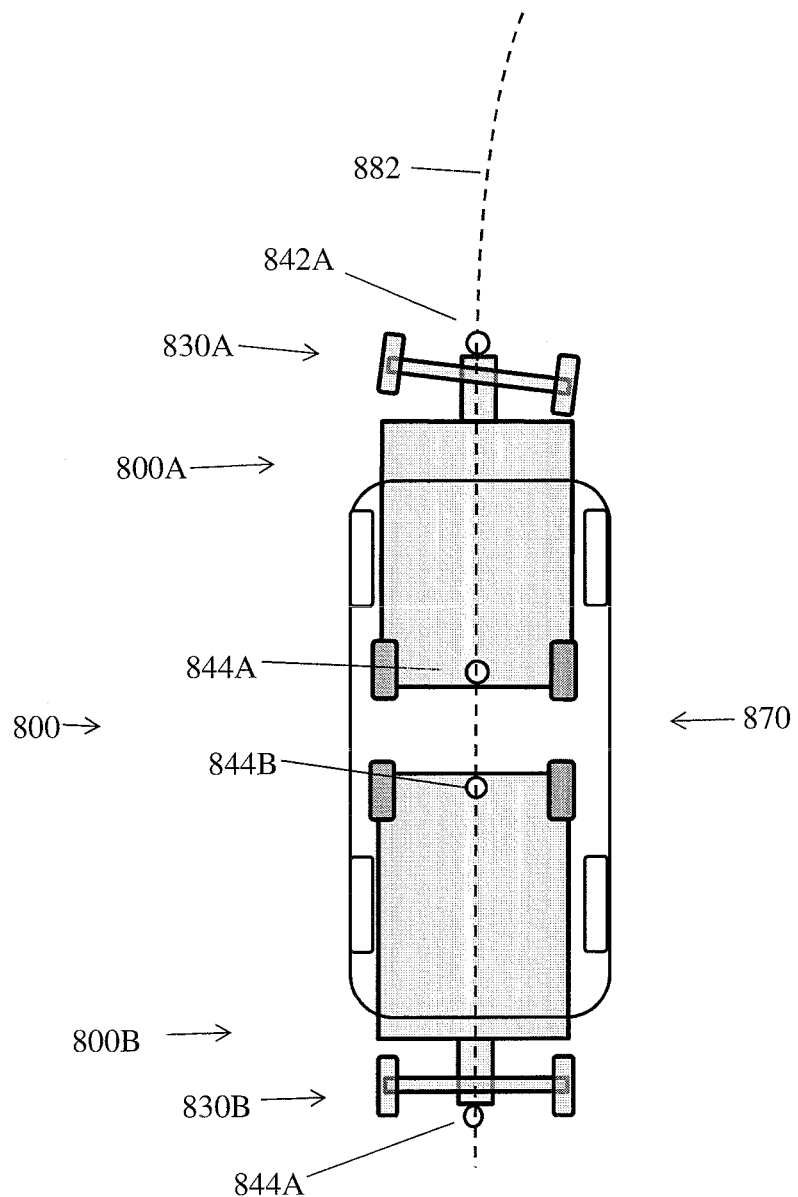
Figure 8C:
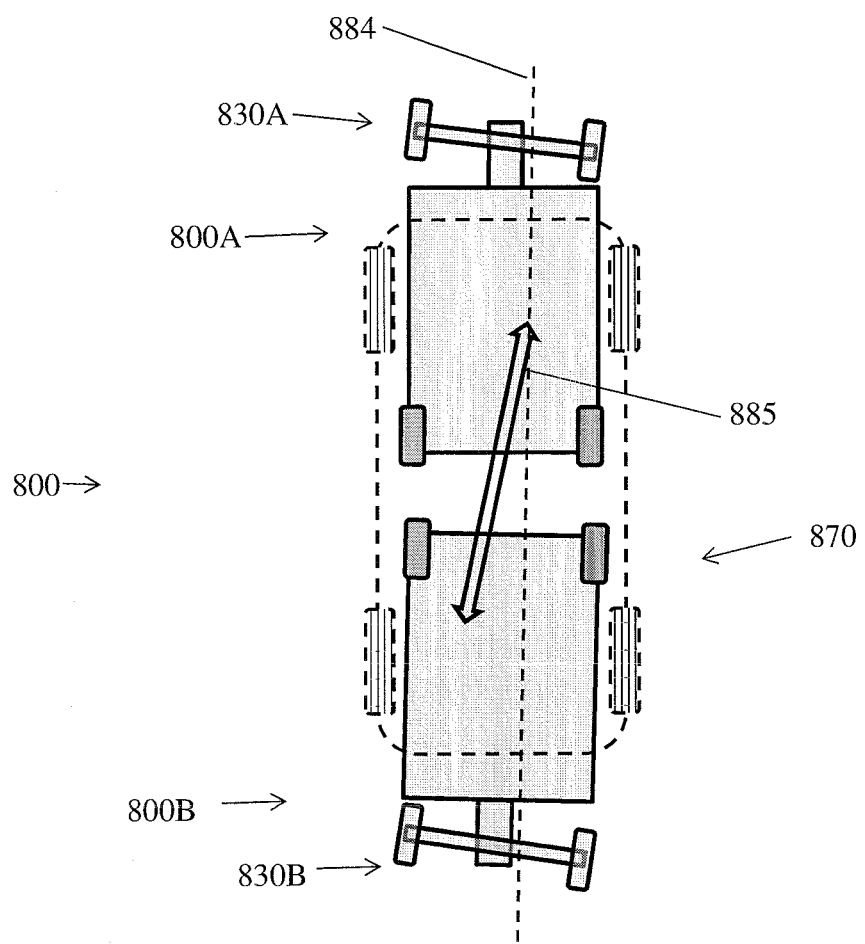

Reference is made now to FIGS. 8A, 8B and 8C, which schematically depict methods of maneuvering of TT 800 with respect to a travel line when no vehicle is carried, when a vehicle is carried and only one steering mechanism is used, and when a vehicle is carried and two steering mechanisms are used, respectively, according to some embodiments of the present invention. FIG. 8A schematically depicts maneuvering of TT 800 along arc line 880, the radius of which is small relative to the length of TT 800. For example, the radius $R_{ARC}$ is no more than 8 times $L_{TT}$. In the depicted situation, no vehicle is carried by TT 800; therefore, the two TTEs forming TT 800, TTE 800A and TTE 800B, may travel so that lines 890A, 890B which are perpendicular to longitudinal central lines 802A, 802B of the respective TEs, form an angle δ between them. The magnitude of angle δ depends mainly on the steering performance of steering mechanisms 830A, 830B.

FIG. 8B depicts maneuvering of TT 800 along a straight line when a shallow curve begins. TT 800 is depicted loaded with vehicle 870 which, as explained above, highly limits the maneuverability of TTE 800A with respect to TTE 800B. In the embodiment depicted in FIG. 8B, TTE 800B follows travel line 882 on a straight portion of it while TTE 800A follows line 882 where it begins to curve. As a result, the image received by optical unit 842A of TTE 800A shows deviation of the image of travel line 882 from the center of the FOV of optical unit 842A, and the control unit of TTE 800A (not shown) provides steering control signals to steering unit 830A to steer to the side that is expected to cause the image of travel line 882 to get closer to the center of the FOV of optical unit 842A, that is to the right in FIG. 8B. The steering will be carried out at the front steering mechanism, steering mechanism 842A, while the rear steering mechanism, steering mechanism 844A will carry out stirring commands to enable TTE 800B to follow behind TTE 800A at a constant distance, while performing minimal direction deviations from the travel direction of TTE 800A and concurrently to follow travel line 882 on the section TTE 800B passes over. Certain small deviations from a straight line that is formed by the central lines of TTE 800A and TTE 800B are allowed, as long as none of the wheels of carried vehicle 870 slips over its respective lifting element (not shown in FIG. 8B), as explained above with respect to FIG. 7.

FIG. 8C depicts maneuvering of TT 800 along straight line 884 when, due to the deviation of TT 800 from line 884, both elements of TT 900, TTE 800A and TTE 800B deviate from line 884 by substantially the same distance. In a manner similar to that described above with respect to FIG. 8B, the deviation is identified by the optical units (not shown in FIG. 8C to minimize obscuring the drawing). When the deviation of TT 800 from the required travel line 884 places TT 800 substantially parallel to travel line 884, a crab walk like maneuver may be exercised to return TT 800 to travel line 884 without changing the heading of TT 800, leaving it substantially parallel to travel line 884. This may be done by steering front steering mechanism 830A to the right, that is to cause front end of TT 800A to travel to the right of the page, and concurrently turning rear steering mechanism 830B substantially parallel to front steering mechanism, thus causing the rear end of TT 800 to move along a line substantially parallel to that performed by the front end of TT 800. This may be pursued until TT 800 returns to travel above travel line 884, as may be indicated by the optical units of TTE 800A and TTE 800B.

Figures 9A, 9B:
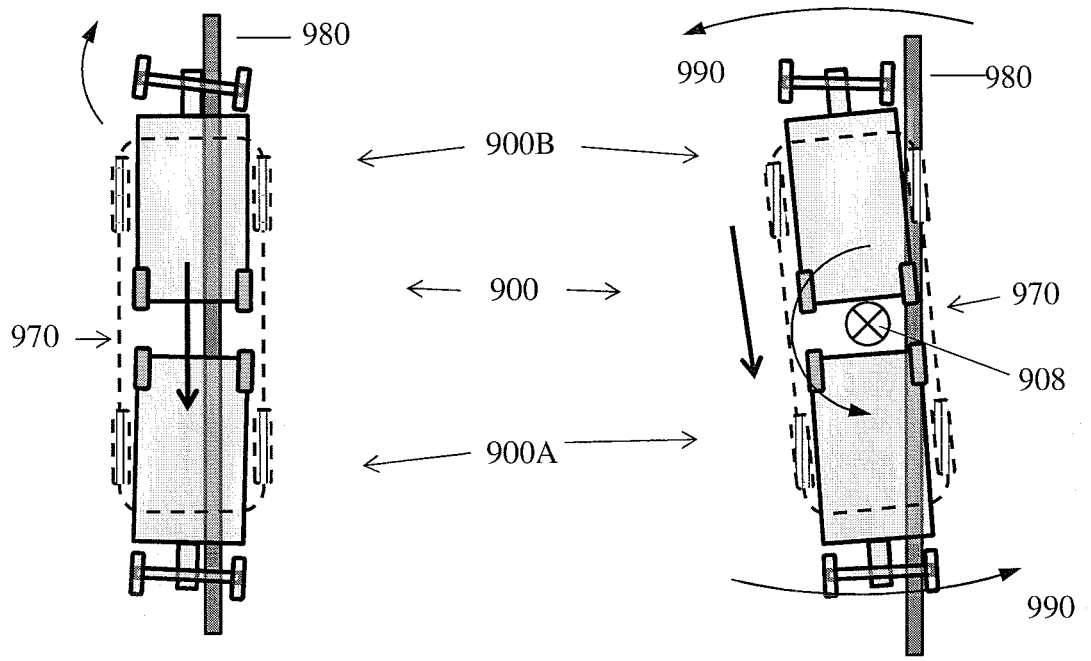
FIGS. 9A, 9B, 9C and 9D schematically depict a process of correction maneuvering of a TT towards a travel line in four respective steps according to some embodiments of the present invention.
Figures 9C, 9D:
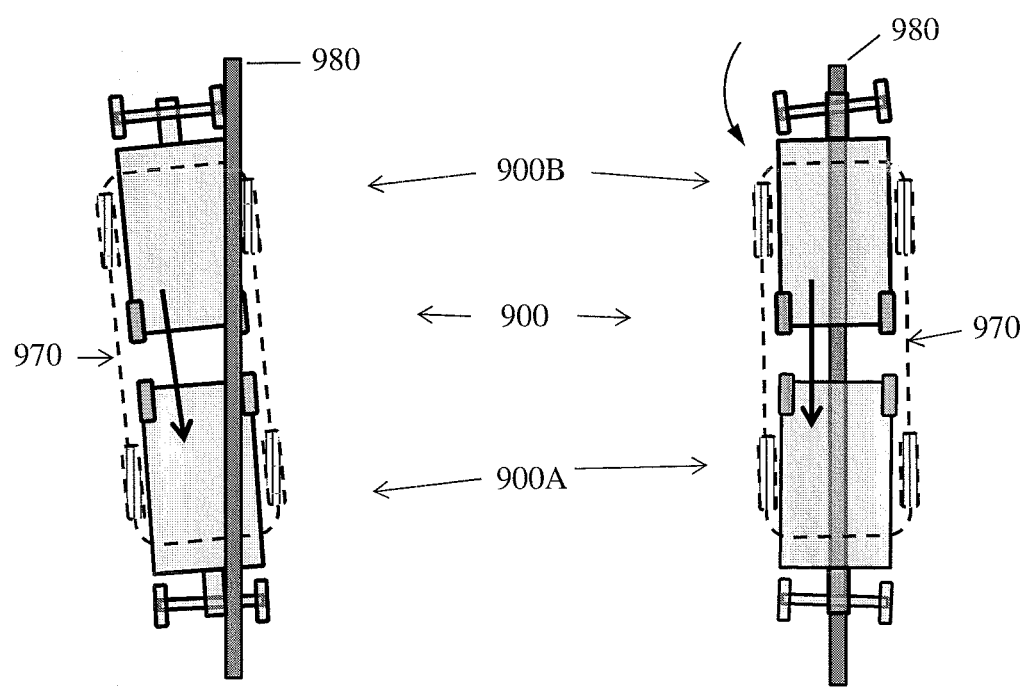

Reference is made now to FIGS. 9A, 9B, 9C and 9D which schematically depict a process of correction maneuvering of TT 900 towards travel line 980 in four respective steps: identifying the deviation from travel line 980, steering a rear steering mechanism to turn the front of TT 900 towards the line, identifying progress of the correction and ending the correction maneuvering, according to some embodiments of the present invention. In FIGS. 9A-9D, the direction of travel is indicated by a straight arrow, from the top of the page towards the bottom of the page. In FIGS. 9A-9D, certain elements and units of TT 900 and of TTE 900A and 900B have not been drawn for better clarity of the drawing. However, TT 900 and TTE 900A and TTE 900B may be similar to TT 700 and TTE 700A and TTE 700B, or to TT 800 and TTE 800A and 800B, respectively. FIG. 9A depicts a stage where TT 900 is identified to be right of travel line 980 and a decision to take a correction maneuver is taken. The maneuver is performed using 'rear steering' by operating the rear steering mechanism of TTE 900B in the direction depicted by the arrow next to it. As a result, as is seen in FIG. 9B, the rear portion of TT 900 turns away from travel line 980 while turning the direction of the front portion of TT 900 towards travel line 980. In general, at this stage, TT 900 performs an anti-clockwise turn. The turn may be done around a center point, such as center point 908, or around another point that resides in the range between the front and rear axles. This may be dictated by several factors, such as the weight distribution of the carried vehicle along the longitudinal line of TT 900, the slip factor of each of its wheels, and like. Regardless of the exact location of the turning point the result of the maneuver directs the front of TT 900 towards travel line 980. Once the rate of correction, as dictated by the angle of convergence of TT 900 to line 980, has been reached, rear steering mechanism may be returned to neutral steering (that no change of direction) as seen in FIG. 9C. As TT 900 proceeds traveling along the current line, the deviation from travel line 980 gets smaller, until the control unit of TT 900 decides to end the correction maneuver. As seen in FIG. 9D, at this point rear steering mechanism may be turned so as to steer TT 900 to reach a direction parallel to travel line 980. Once TT 900 straightens with travel line 980, rear steering mechanism may be placed again to neutral position at which stage the correction maneuver ends.

Figure 10A:
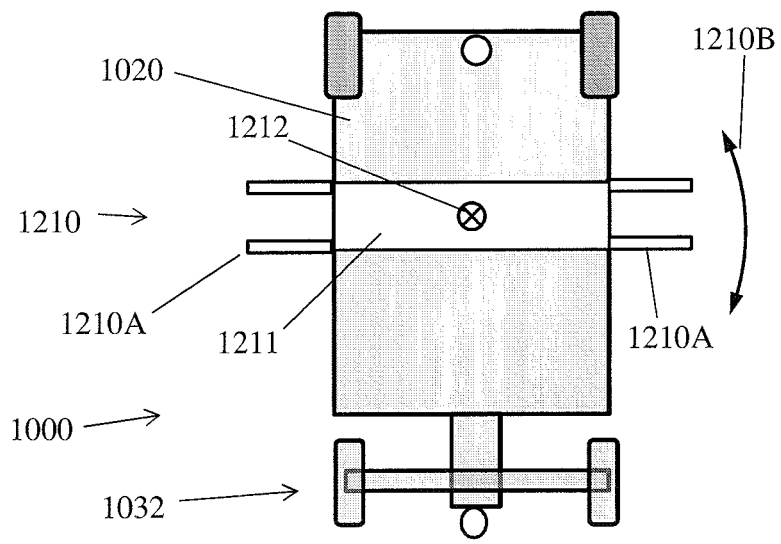
FIGS. 10A and 10B schematically illustrate a TTE in mid-position of a lifting mechanism and in two rotation edges of the lifting mechanism, respectively, constructed and operative according to some embodiments of the present invention.
Figure 10B:
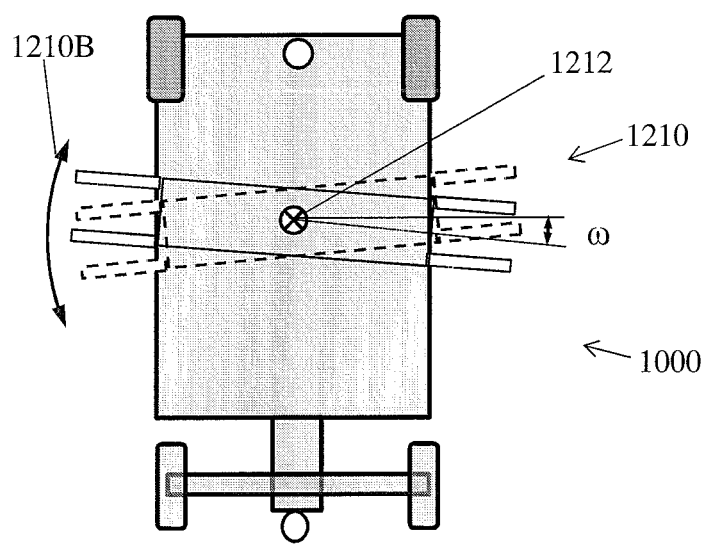

Reference is made now to FIGS. 10A and 10B which schematically illustrate TTE 1000 in mid-position of lifting mechanism 1210 and in two rotation edges of lifting mechanism, respectively, constructed and operative according to some embodiments of the present invention. TTE 1000 comprise main body 1020 which is similar to main body 220 of FIG. 2A, and steering mechanism 1032 which is similar to steering mechanism 232 of FIG. 2A. TTE 1000 further comprises lifting mechanism 1210, which comprise two pairs of lifting elements 1210A and lifting support element 1211. Two pairs of lifting elements 1210A are adapted to operate similar to two pairs of lifting elements 210 of FIG. 2A in the sense of being movable between stowed position and lifting position; however, they are not connected to main body 1020. Two pairs of lifting elements 1210A are connected to lifting support element 1211 which crosses substantially from one side of main body 1020 to the other side and is rotatable about pivot point 1212 with respect to main body 1020, as is depicted by arrow 1210B. Accordingly, two pairs of lifting elements 1210A are rotatable about pivot point 1212 along with lifting support element 1211, substantially as a unified unit. Rotation of lifting mechanism 1210 about pivot point 1212 may be, according to some embodiments of the present invention, free rotation, and the actual angle of rotation ±ω of lifting mechanism 1210 with respect to main body 1020 may be dictated mainly by the relative angular horizontal force and position between TTE 1000 and a vehicle that is carried on it (not shown in FIGS. 10A and 10B). According to some embodiments of the present invention, the maximal angle of rotation ω may be ±5°. This free degree of rotation may enhance the maneuverability of a TT operating according to some embodiments of the present invention. For example, as discussed with respect to embodiments described in FIGS. 7, 8B, and 9A-9D, one parameter that limits the maneuverability of a TT that is operating according to some embodiments of the present invention when it is loaded with a vehicle is the maximal angle that may be opened between the longitudinal central lines of the two TTEs of the TT, an angle that is limited for TTEs that are described with respect to these drawings by the magnitude of allowed disorientation of a wheel of a loaded vehicle from the position of a wheel lying freely on the lifting elements, before this wheel slides over the lifting element and falls from it. For example, the maneuver described in FIG. 8A with respect to TT comprising TTEs of the kind described in FIGS. 8A-8C, which is traveling along an arc path, is limited to travel without a vehicle loaded on the TT. However, for a TT comprising TTEs such as TTE 1000, this travel may be carried out with a vehicle loaded on the TT. The mechanical arrangement for connecting lifting mechanism 1210 to main body 1020 may be any mechanical connection known in the art that provides free rotation at least within the limits of ±5° in a plane parallel to a plane tangential to the circumference of the four wheels of TT 1000 and mechanical support enabling lifting mechanism 1210 to lean on main body 1020.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. An autonomous transporting tool (TT) configured to travel along a guiding line comprising:
    a first transporting tool element (TTE); and
    a second transporting tool element (TTE),
    each of said transporting tool elements comprising:
        four wheels, each of them is separately motorized by a respective motor;
        a steering mechanism comprising two of the wheels connected to an axle that is pivotally connected to a main body of the transporting tool element by a pivot;
        a control system;
        an optical system comprising two cameras and two lighting units, wherein a first camera and a first lighting unit are located proximal to a first end of said transporting tool element and said second camera and said second lighting unit are located proximal to a second end of said transporting tool element and wherein said first and second lighting units are directed to illuminate the field of view each of its respective camera; and
        communication unit that allows said first transporting tool element and said second transporting tool element to communicate at least with each other,
    wherein said first and second transporting tool elements are mechanically disengaged,
    wherein said first and second transporting tool elements are configured to communicate with each other via a wireless communication channel that manages and controls the distance between them and coordinates movements of the first and second transporting tool elements, and
    wherein said control system is configured to:
        control a location of the first transporting tool element to thereby lift a first pair of wheels of a vehicle onto the first transporting tool element;
        control a location of the second transporting tool element to thereby lift a second pair of wheels of the vehicle onto the second transporting tool element; and
        control each of said steering mechanisms and said respective motors to maintain the distance between the first and second transporting tool elements to be equal to the distance between the front and the rear axles of the vehicle.

2. The autonomous transporting tool of claim 1, wherein at least one of said first and said second transporting tool elements further comprises distance measuring sensor configured to measure the distance between said first and said second transporting tool elements.

3. The autonomous transporting tool of claim 1, further comprising at least one lateral optical sensor that determines the location of a respective TTE with respect to a respective pair of wheels of a vehicle.

4. The autonomous transporting tool of claim 1, wherein said communication unit is further configured to communicate with a central control unit.

5. The autonomous transporting tool of claim 1, wherein said steering mechanism is responsive to location of images of said guiding line in at least one of said first or said second optical systems of at least one of said first and said second TTEs.

6. A system for guiding at least one autonomous transporting tool (TT) configured to travel along a guiding line, the system comprising:
    at least one autonomous transporting tool (TT), said TT comprising:
        a first transporting tool element (TTE); and
        a second transporting tool element (TTE),
        each of said transporting tool elements comprising:
            four wheels each of them is separately motorized by a respective motor;
            a steering mechanism comprising two of the wheels connected to an axle that is pivotally connected to a main body of the transporting tool element by a pivot;
            a control system;
            an optical system comprising two cameras and two lighting units, wherein a first camera and a first lighting unit are located proximal to a first end of said transporting tool element and said second camera and said second lighting unit are located proximal to a second end of said transporting tool element and wherein said first and second lighting units are direct to illuminate the field of view each of its respective camera; and
            communication unit that allows said first transporting tool element and said second transporting tool element to communicate at least with each other,
        wherein said first and second transporting tool elements are mechanically disengaged,
        wherein said first and second transporting tool elements are configured to communicate with each other via a wireless communication channel that manages and controls the distance between them and coordinates movements of the first and second transporting tool elements,
        wherein said control system is configured to:
            control a location of the first transporting tool element to thereby lift a first pair of wheels of a vehicle onto the first transporting tool element;
            control a location of the second transporting tool element to thereby lift a second pair of wheels of the vehicle onto the second transporting tool element; and
            control each of said steering mechanisms and said respective motors to maintain the distance between the first and second transporting tool elements to be equal to the distance between the front and the rear axles of the vehicle; and
    a central controller that controls operations involved in operating a parking space in which the vehicle is to be parked.

7. The system of claim 6, wherein at least one of said first and said second transporting tool elements further comprising distance measuring sensor configured to measure the distance between said first and said second transporting tool elements.

8. The system of claim 6, wherein said autonomous transporting tool further comprises at least one lateral optical sensor that determines the location of a respective TTE with respect to a respective wheel of a vehicle.

9. The system of claim 6, wherein said communication unit is further configured to communicate with said central control unit.

10. The system of claim 6, wherein said steering mechanism is responsive to location of images of said guiding line in at least one of said first or said second optical systems of at least one of said first and said second TTEs.

11. A method for guiding an autonomous transporting tool (TT) along a guiding line comprising:
providing two transporting tool elements (TTEs) each comprising:
four wheels, each of them is separately motorized by a respective motor;
a steering mechanism comprising two of the wheels connected to an axle that is pivotally connected to a main body of the transporting tool elements by a pivot;
a control system;
an optical system comprising two cameras and two lighting units, wherein a first camera and a first lighting unit are located proximal to a first end of said transporting tool element and said second camera and said second lighting unit are located proximal to a second end of said transporting tool element and wherein said first and second lighting units are direct to illuminate the field of view each of its respective camera; and
communication unit that allows said first transporting tool element and said second transporting tool element to communicate at least with each other,
wherein said first and second transporting tool elements are mechanically disengaged,
wherein said first and second transporting tool elements are configured to communicate with each other via a wireless communication channel to manage and control the distance between them and coordinate movements of the first and second tool elements,
wherein said control system is configured to:
control a location of the first transporting tool element to thereby lift a first pair of wheels of a vehicle onto the first transporting tool element;
control a location of the second transporting tool element to thereby lift a second pair of wheels of the vehicle onto the second transporting tool element; and
control said steering mechanism and said respective motors to maintain the distance between the first and second transporting tool elements to be equal to the distance between the front and the rear axles of the vehicle,
illuminating the scene in the FOV of each of said optical systems;
receiving image from at least one optical system in each of said TTEs;
identifying in said image the image of a guiding line and its deviation from the center of said image in said at least one optical system;
determining required steering changes and providing steering instructions to said steering mechanism based on said required changes.

12. The method of claim 11, further comprising:
repeating the step of identifying and the step of determining until said deviation is smaller than a predefined value.

13. The method of claim 12, wherein said control system of said leading TTE issues steering commands to said leading TTE to decrease the value of said deviation.

14. The method of claim 13, wherein said control system of said leading TTE issues steering commands to the trailing TTE to follow said leading TTE.

15. The method of claim 11, wherein the control system of the TTE which is leading the travel controls the travel.

* * * * *